United States Patent
Clift et al.

(10) Patent No.: US 11,601,707 B2
(45) Date of Patent: *Mar. 7, 2023

(54) TECHNIQUES FOR ATSC 3.0 BROADCAST BOUNDARY AREA MANAGEMENT USING PLURAL TUNERS

(71) Applicant: Sony Group Corporation, Tokyo (JP)

(72) Inventors: Graham Clift, Poway, CA (US); Luke Fay, San Diego, CA (US); Brant Candelore, Poway, CA (US); Adam Goldberg, Fairfax, VA (US); Fred Ansfield, San Diego, CA (US); Loren F. Pineda, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/488,274

(22) Filed: Sep. 28, 2021

(65) Prior Publication Data

US 2023/0042580 A1 Feb. 9, 2023

Related U.S. Application Data

(60) Provisional application No. 63/260,015, filed on Aug. 6, 2021.

(51) Int. Cl.
*H04N 21/426* (2011.01)
*H04H 60/82* (2008.01)
(Continued)

(52) U.S. Cl.
CPC ...... *H04N 21/42607* (2013.01); *H04H 60/19* (2013.01); *H04H 60/82* (2013.01); *H04N 21/2665* (2013.01); *H04N 21/4263* (2013.01)

(58) Field of Classification Search
CPC ......... H04N 21/42607; H04N 21/2665; H04N 21/4263; H04H 60/19; H04H 60/82
See application file for complete search history.

(56) References Cited

U.S. PATENT DOCUMENTS

| 4,169,226 A | 9/1979 | Fukuji |
| 4,804,972 A | 2/1989 | Schudel |

(Continued)

FOREIGN PATENT DOCUMENTS

| CN | 1941868 B | 5/2010 |
| EP | 0689307 B1 | 10/2002 |

(Continued)

OTHER PUBLICATIONS

"ATSC Standard: A/300:2021, ATSC 3.0 System", Doc. A/300:2021, Jul. 7, 2021.

(Continued)

*Primary Examiner* — Nnenna N Ekpo
(74) *Attorney, Agent, or Firm* — John L. Rogitz (57) ABSTRACT

Techniques are described for expanding and/or improving the Advanced Television Systems Committee (ATSC) 3.0 television protocol in robustly delivering the next generation broadcast television services. In a boundary region between first and second broadcast stations in which a receiver can pick up signals from both stations, a primary tuner presents a demanded service while a secondary tuner scans for duplicate transmissions of the service, and if one is found, the version with the better quality metrics may be presented.

20 Claims, 9 Drawing Sheets

(51) Int. Cl.
*H04N 21/2665* (2011.01)
*H04H 60/19* (2008.01)

(56) References Cited

U.S. PATENT DOCUMENTS

| | | | |
|---|---|---|---|
| 5,528,253 | A | 6/1996 | Franklin |
| 6,023,242 | A | 2/2000 | Dixon |
| 6,072,440 | A | 6/2000 | Bowman |
| 6,538,612 | B1 | 3/2003 | King |
| 6,832,070 | B1 | 12/2004 | Perry et al. |
| 6,904,609 | B1 | 6/2005 | Pietraszak et al. |
| 7,075,492 | B1 | 7/2006 | Chen et al. |
| 7,076,202 | B1 | 7/2006 | Billmaier |
| 7,194,753 | B1 | 3/2007 | Fries et al. |
| 7,239,274 | B2 | 7/2007 | Lee et al. |
| 7,472,409 | B1 | 12/2008 | Linton |
| 7,685,621 | B2 | 3/2010 | Matsuo |
| 7,865,930 | B2 | 1/2011 | Kim |
| 8,290,492 | B2 | 10/2012 | Lu et al. |
| 8,368,611 | B2 | 2/2013 | King et al. |
| 8,787,237 | B2 | 7/2014 | Väre et al. |
| 9,548,826 | B2 | 1/2017 | Kitazato et al. |
| RE46,304 | E | 2/2017 | Kim et al. |
| 10,904,791 | B2 | 1/2021 | Naik et al. |
| 10,938,511 | B2 | 3/2021 | Kwak et al. |
| 10,939,180 | B2 | 3/2021 | Yang et al. |
| 2003/0051246 | A1 | 3/2003 | Wilder et al. |
| 2003/0214449 | A1 | 11/2003 | King |
| 2004/0128689 | A1 | 7/2004 | Pugel et al. |
| 2004/0227655 | A1 | 11/2004 | King |
| 2005/0108751 | A1 | 5/2005 | DaCosta |
| 2005/0193415 | A1 | 9/2005 | Ikeda |
| 2005/0225495 | A1 | 10/2005 | King |
| 2006/0020978 | A1 | 1/2006 | Miyagawa |
| 2006/0139499 | A1 | 6/2006 | Onomatsu et al. |
| 2006/0184962 | A1 | 8/2006 | Kendall et al. |
| 2006/0187117 | A1 | 8/2006 | Lee et al. |
| 2007/0152897 | A1 | 7/2007 | Zimmerman et al. |
| 2008/0129885 | A1 | 6/2008 | Yi et al. |
| 2008/0186242 | A1 | 8/2008 | Shuster et al. |
| 2008/0186409 | A1 | 8/2008 | Kang et al. |
| 2008/0273497 | A1 | 11/2008 | Lu et al. |
| 2009/0021641 | A1* | 1/2009 | Matsuura ........... H04N 21/4622 348/553 |
| 2009/0135309 | A1 | 5/2009 | DeGeorge et al. |
| 2009/0260038 | A1 | 10/2009 | Acton et al. |
| 2009/0310030 | A1 | 12/2009 | Litwin et al. |
| 2010/0118197 | A1 | 5/2010 | Kim |
| 2010/0214482 | A1 | 8/2010 | Kang |
| 2010/0235858 | A1 | 9/2010 | Muehlbach |
| 2010/0315307 | A1 | 12/2010 | Syed et al. |
| 2011/0126232 | A1 | 5/2011 | Lee et al. |
| 2012/0133840 | A1 | 5/2012 | Shirasuka et al. |
| 2013/0207868 | A1 | 8/2013 | Venghaus et al. |
| 2015/0161236 | A1 | 6/2015 | Beaumont et al. |
| 2015/0161249 | A1 | 6/2015 | Knox et al. |
| 2015/0162897 | A1* | 6/2015 | Zachara ............... H01Q 21/28 455/77 |
| 2015/0189376 | A1* | 7/2015 | Bazata ............ H04N 21/23439 725/114 |
| 2015/0382217 | A1 | 12/2015 | Odio Vivi et al. |
| 2016/0014571 | A1 | 1/2016 | Lee et al. |
| 2016/0173945 | A1 | 6/2016 | Oh et al. |
| 2016/0255394 | A1 | 9/2016 | Yang et al. |
| 2016/0330525 | A1* | 11/2016 | Freeman ................ H04L 67/02 |
| 2017/0064528 | A1 | 3/2017 | Daly et al. |
| 2017/0317408 | A1 | 11/2017 | Hamada et al. |
| 2017/0318353 | A1 | 11/2017 | Petruzzelli et al. |
| 2017/0318502 | A1* | 11/2017 | Singh ................... H04W 76/30 |
| 2017/0374421 | A1 | 12/2017 | Yim et al. |
| 2018/0048854 | A1 | 2/2018 | Kwak et al. |
| 2018/0120169 | A1 | 5/2018 | Jackson et al. |
| 2018/0139495 | A1 | 5/2018 | Eyer |
| 2018/0359541 | A1 | 12/2018 | Park et al. |
| 2019/0037418 | A1 | 1/2019 | Gunasekara et al. |
| 2019/0079659 | A1 | 3/2019 | Adenwala et al. |
| 2019/0335221 | A1 | 10/2019 | Walker et al. |
| 2019/0373305 | A1 | 12/2019 | Fang et al. |
| 2020/0077125 | A1 | 3/2020 | An et al. |
| 2020/0169775 | A1 | 5/2020 | Clift |
| 2020/0297955 | A1 | 9/2020 | Shouldice |
| 2020/0305003 | A1 | 9/2020 | Landa et al. |
| 2020/0367316 | A1 | 11/2020 | Cili et al. |
| 2022/0256232 | A1 | 8/2022 | Pesin et al. |

FOREIGN PATENT DOCUMENTS

| | | |
|---|---|---|
| EP | 2061166 A2 | 5/2009 |
| EP | 2068470 A2 | 6/2009 |
| EP | 2187530 A4 | 12/2011 |
| EP | 3340636 A4 | 1/2019 |
| JP | 2012049853 A | 3/2012 |
| JP | 5372342 B2 | 12/2013 |
| JP | 2020010249 A | 1/2020 |
| KR | 100824606 B1 | 4/2008 |
| KR | 20080069826 A | 7/2008 |
| KR | 1020080069826 A | 7/2008 |
| KR | 20190139454 A | 12/2019 |
| KR | 20210001101 A | 1/2021 |

OTHER PUBLICATIONS

"ATSC Standard: ATSC 3.0 Interactive Content", Doc. A/344:2021, Mar. 23, 2021.

"ATSC Standard: Physical Layer Protocol", Doc. A/322:2021, Jan. 20, 2021.

"ATSC Standard: Signaling, Delivery, Synchronization, and Error Protection", Doc. A/331:2017, Dec. 6, 2017.

"TRINOVA Boss—Manual", Televes, www.televes.com.

"TV Motion: TriMotion + TriNova Boss", TELEVES, Jul. 2015.

"TVMOTION system", TELEVES, retrieved on Sep. 8, 2021 from https://www.televes.com/me/g-006-tvmotion-system.html.

Ahn et al., "ATSC 3.0 for Future Broadcasting: Features and Extensibility", Set International Journal of Broadcast Engineering, 2020 retrieved from https://web.archive.org/web/20201227132053id_/https://set.org.br/ijbe/ed6/Artigo2.pdf.

ATSC Standard: Signaling, Delivery, Synchronization, and Error Protection, Doc. A/331:2021, Jan. 19, 2021.

B. Lee, K. Yang, S. -j. Ra and B. Bae, "Implementation of ATSC 3.0 Service Handoff," 2020 International Conference on Information and Communication Technology Convergence (ICTC), 2020, pp. 1429-1432, doi: 10.1109/ICTC49870.2020.9289581.

Clift et al., "Techniques for ATSC 3.0 Broadcast Boundary Area Management Using Complete Service Reception During Scan To Determine Signal Quality of Frequencies Carrying the Duplicate Service", file history of related U.S. Appl. No. 17/488,258, filed Sep. 28, 2021.

Clift et al., "Techniques for ATSC 3.0 Broadcast Boundary Area Management Using Plural Tuners Handing Off Between Presentation and Scanning", file history of related U.S. Appl. No. 17/489,675, filed Sep. 29, 2021.

Clift et al., "Techniques for ATSC 3.0 Broadcast Boundary Area Management Using Plural Tuners With Different Numbers of Antennae", file history of related U.S. Appl. No. 17/489,638, filed Sep. 29, 2021.

Clift et al., "Techniques for ATSC 3.0 Broadcast Boundary Area Management Using Signal Quality and Packet Errors to Differentiate Between Duplicated Services on Different Frequencies During Scan", file history of related U.S. Appl. No. 17/487,753, filed Sep. 28, 2021.

Clift et al., "Techniques for Receiving Non-Real Time (NRT) Data Whilst Traversing a Multifrequency Network Boundary", file history of related U.S. Appl. No. 17/489,694, filed Sep. 29, 2021.

Fay et al., "RF Channel Description for Multiple Frequency Networks", file history of related U.S. Appl. No. 17/525,750, filed Nov. 12, 2021.

Goldberg et al., "ATSC 3 Application Context Switching and Sharing", file history of related U.S. Appl. No. 17/489,708, filed Sep. 29, 2021.

(56) References Cited

OTHER PUBLICATIONS

Goldberg et al., "ATSC 3 Reception Across Boundary Conditions Using Location Data", file history of related U.S. Appl. No. 17/489,732, filed Sep. 29, 2021.
S. -I. Park et al., "ATSC 3.0 Transmitter Identification Signals and Applications," in IEEE Transactions on Broadcasting, vol. 63, No. 1, pp. 240-249, Mar. 2017, doi: 10.1109/TBC.2016.2630268.
Y. T. Abdelrahman, R. A. Saeed and A. El-Tahir, "Multiple Physical Layer Pipes performance for DVB-T2,", 2017 International Conference on Communication, Control, Computing and Electronics Engineering (ICCCCEE), 2017, pp. 1-7, doi: 10.1109/ICCCCEE.2017.7867634.
Clift et al., "Techniques for ATSC 3.0 Broadcast Boundary Area Management Using Plural Tuners Handing Off Between Presentation and Scanning", related U.S. Appl. No. 17/489,675 Non-Final Office Action dated Jul. 28, 2022.
Clift et al., "Techniques for ATSC 3.0 Broadcast Boundary Area Management Using Plural Tuners Handing Off Between Presentation and Scanning", related U.S. Appl. No. 17/489,675, Applicant's response to Non-Final Office Action filed Oct. 10, 2022.
Clift et al., "Techniques for ATSC 3.0 Broadcast Boundary Area Management Using Plural Tuners With Different Numbers of Antennae", related U.S. Appl. No. 17/489,638, Non-Final Office Action dated Jun. 9, 2022.
Clift et al., "Techniques for ATSC 3.0 Broadcast Boundary Area Management Using Plural Tuners With Different Numbers of Antennae", related U.S. Appl. No. 17/489,638, Applicant's response to Non-Final Office Action filed Sep. 8, 2022.
Clift et al., "Techniques for Receiving Non-Real Time (NRT) Data Whilst Traversing a Multi-frequency Network Boundary", related U.S. Appl. No. 17/489,694, Applicant's response to Non-Final Office Action filed Oct. 10, 2022.
Clift et al., "Techniques for Receiving Non-Real Time (NRT) Data Whilst Traversing a Multi-frequency Network Boundary", related U.S. Appl. No. 17/489,694, Non-Final Office Action dated Sep. 29, 2022.
Clift et al., "Techniques for ATSC 3.0 Broadcast Boundary Area Management Using Signal Quality and Packet Errors To Differentiate Between Duplicated Services On Different Frequencies During Scan", related U.S. Appl. No. 17/487,753, Non-Final Office Action dated Nov. 16, 2022.
Goldberg et al., "ATSC 3 Reception Across Boundary Conditions Using Location Data", related U.S. Appl. No. 17/489,732 Non-Final Office Action dated Nov. 7, 2022.
Goldberg et al., "ATSC 3 Reception Across Boundary Conditions Using Location Data", related U.S. Appl. No. 17/489,732, Applicant's response to Non-Final Office Action filed Nov. 17, 2022.

\* cited by examiner

TECHNIQUES FOR ATSC 3.0 BROADCAST BOUNDARY AREA MANAGEMENT USING PLURAL TUNERS

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard.

As understood herein, an ATSC 3.0 receiver scans for services including in reception areas that contain two or more frequencies carrying the same service, as may occur in a boundary region in which broadcast signals from two regional ATSC 3.0 broadcaster stations overlap. These boundary regions exist in a multifrequency network (MFN). Present principles are directed to managing receiver operation in such regions as divulged below.

SUMMARY

Accordingly, in broadcast digital television having at least one boundary region in which at least one DTV receiver receives broadcast signals from at least first and second digital television broadcast assemblies, a method includes using a first tuner of a digital television receiver, receiving a demanded service carried by a first broadcast signal. The method also includes using a second tuner of the digital television receiver for scanning a frequency spectrum for a duplicate of the demanded service carried by a second signal from the first digital television broadcaster assembly or from the second digital television broadcaster assembly. The method includes identifying respective first and second quality metrics associated with the respective demanded service and duplicate of the demanded service to form a basis for selecting which broadcast signal to tune to for presenting a service.

The digital television receiver can include an advanced television systems committee (ATSC) 3.0 receiver.

In some examples the method includes automatically tuning to the first or second broadcast signal based on the quality metric of the respective first or second broadcast signal without user intervention. In other examples the method includes presenting an audibly or visually perceptive message to tune to the first or second broadcast signal based on the quality metric of the respective first or second broadcast signal. The digital TV receiver can be a mobile receiver.

The first and second quality metrics can include signal-to-noise ratios (SNR). The first and second quality metrics can include packet error number (PEN).

If desired, the method may include presenting the demanded service responsive to the second quality metric of the duplicate of the demanded service not exceeding the first quality metric of the demanded service by at least a threshold.

In another aspect, a digital television apparatus includes at least one receiver configured to receive digital television from a digital television transmitter system having at least first and second broadcast transmitters. The receiver includes at least one processor programmed with instructions to present a demanded service acquired from a first tuner, and while presenting the demanded service, use a second tuner to scan for a duplicate of the demanded service. The instructions are executable to determine respective quality metrics associated with the demanded service and the duplicate of the demanded service. The instructions also are executable to select to present the demanded service or the duplicate of the demanded service based on the quality metrics.

In another aspect, a digital television apparatus includes at least one receiver that in turn includes at least one processor programmed with instructions to configure the processor to receive from plural digital television broadcasters respective frequencies, and present a service on the receiver received from a first tuner tuned to a first one of the frequencies. The instructions are executable to scan the frequencies for a duplicate of the service using a second tuner and responsive to a relationship of quality metric of the duplicate of the service to a quality metric of the service, present the duplicate of the service in lieu of the service from the first tuner.

The details of the present application, both as to its structure and operation, can best be understood in reference to the accompanying drawings, in which like reference numerals refer to like parts, and in which:

DETAILED DESCRIPTION

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 publication A/331, Annex B, section 13, incorporated herein by reference, may be particularly relevant to techniques described herein.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A [claim] having at least one of A, B, and C" (likewise "having at least one of A, B, or C" and "having at least one of A, B, C") includes A alone, B alone, C alone, A and B together, A and C together, B and C together, and/or A, B, and C together, etc.

Figure 1:
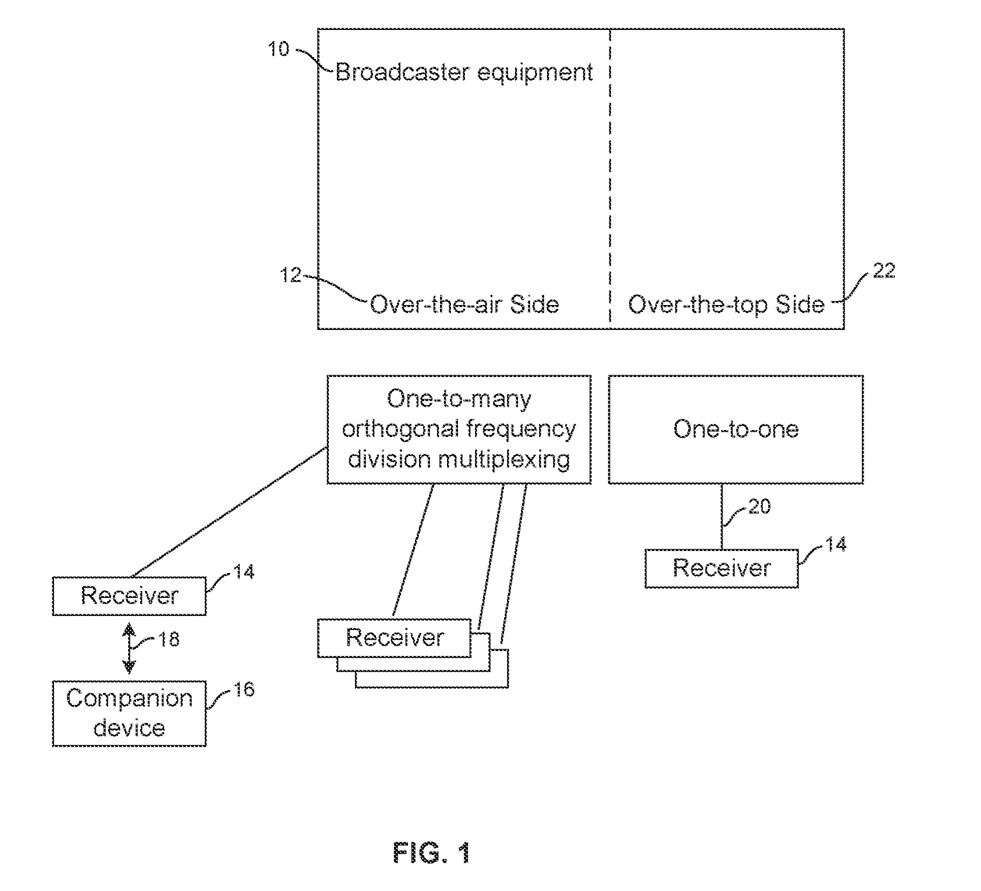
FIG. 1 illustrates an Advanced Television Systems Committee (ATSC) 3.0 system.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
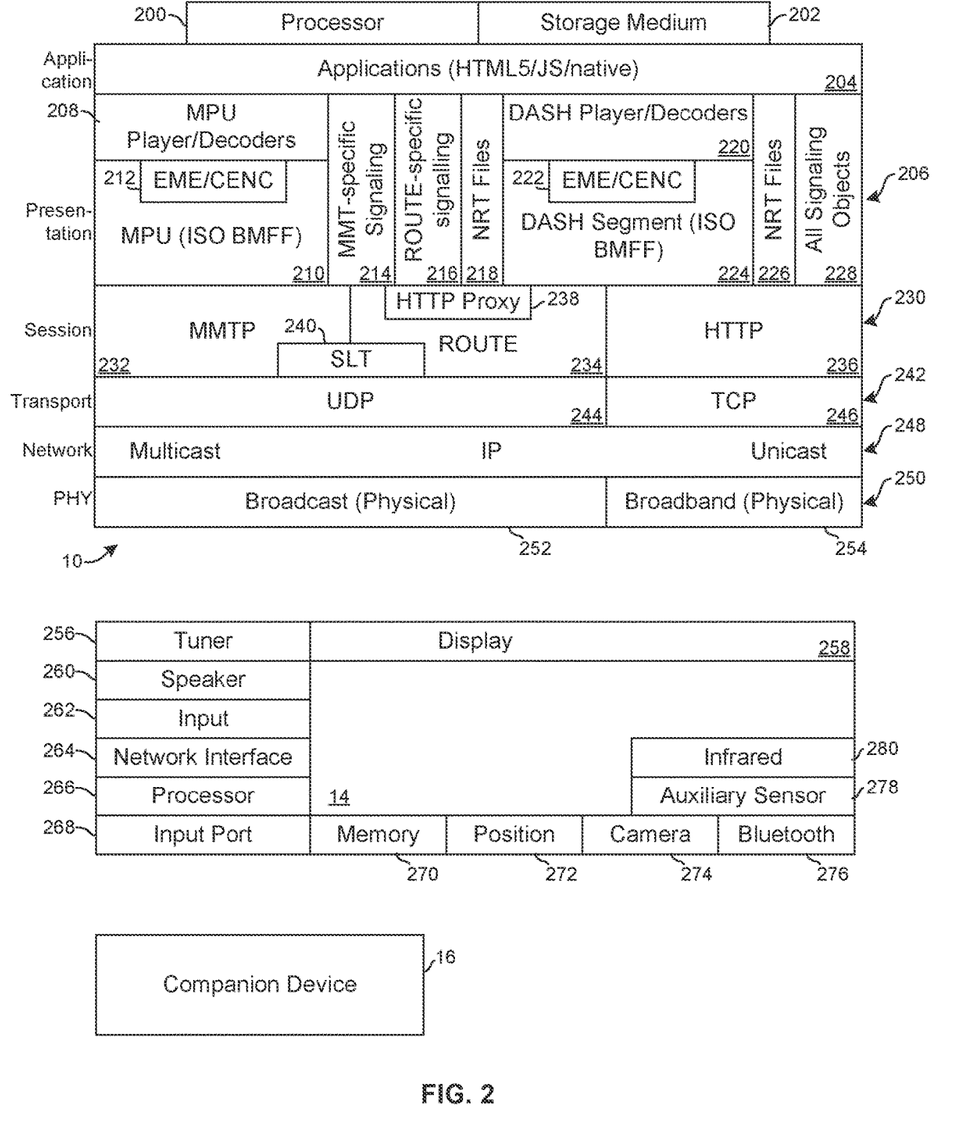
FIG. 2 illustrates components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC-4) format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/ common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/ BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/ microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
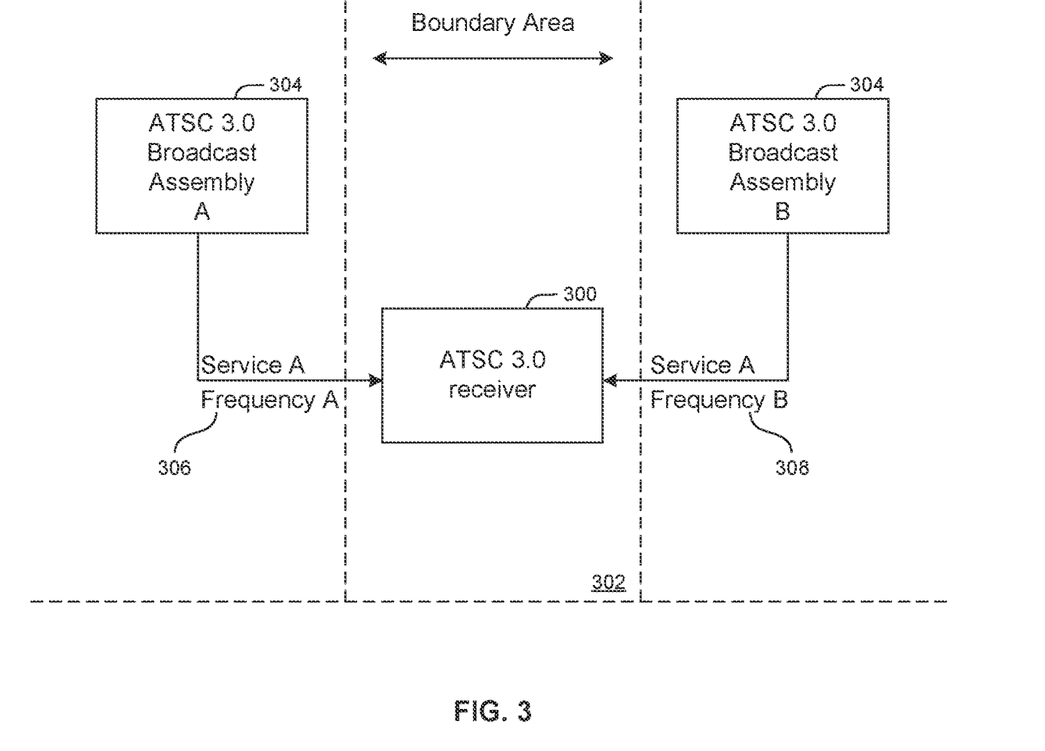
FIG. 3 illustrates an example specific system.

Now referring to FIG. 3, a simplified digital TV system such as an ATSC 3.0 system is shown. In FIG. 3, a mobile or stationary digital TV receiver such as an ATSC 3.0 receiver 300 that may include any or all of the relevant components discussed above in relation to FIGS. 1 and 2 is located in a boundary region 302 between first and second ATSC 3.0 broadcast stations or assemblies 304, with signals from both broadcast stations 304 being picked up by the receiver 300 in the region 302. A first ATSC 3.0 service ("Service A") is broadcast from the first broadcast station 304 over a first frequency 306, whereas the same service A is broadcast from the second broadcast station 304 over a second frequency 308 different from the first frequency 306. The receiver 300 picks up both frequencies, i.e., the receiver 300 picks up signals from both broadcast stations 304.

Figure 4:
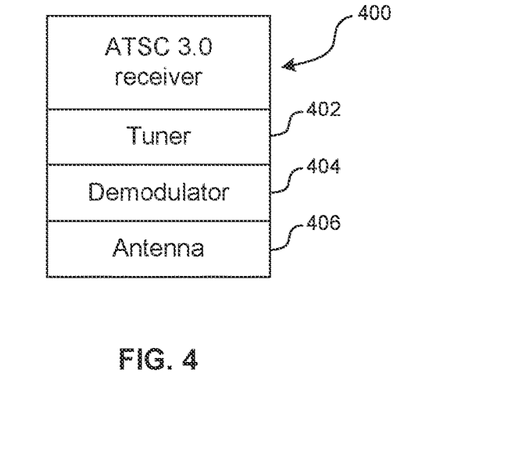
FIG. 4 illustrates a first example embodiment of a digital TV receiver.

FIG. 4 illustrates an example non-limiting embodiment of a digital TV receiver such as an ATSC 3.0 receiver 400 that may include any or all of the relevant components discussed above in relation to FIGS. 1 and 2. In the example shown, the ATSC 3.0 receiver 400 may be a stationary receiver, e.g., a receiver located inside a home. In some examples, the ATSC 3.0 receiver 400 may be a mobile receiver, e.g., as by being implemented in a mobile phone or being disposed in a moving vehicle.

The example ATSC 3.0 receiver 400 shown in FIG. 4 includes a tuner 402 sending signals to a demodulator 404 that the tuner picks up from one or more antennae 406. In the example shown, the receiver 400 includes one and only one tuner, one and only one demodulator, and one and only one antenna.

Figure 5:
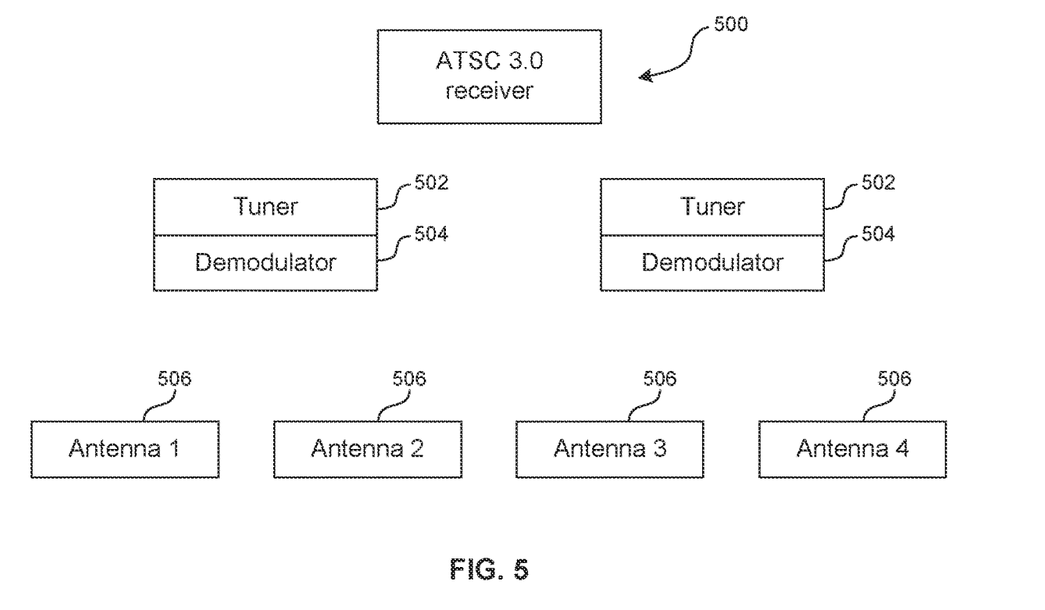
FIG. 5 illustrates a second example embodiment of a digital TV receiver.

In contrast, FIG. 5 illustrates an example non-limiting embodiment of a digital TV receiver such as an ATSC 3.0 receiver 500 that may include any or all of the relevant components discussed above in relation to FIGS. 1 and 2. In the example shown, the ATSC 3.0 receiver 500 may be a mobile receiver, e.g., as by being implemented in a mobile phone or being disposed in a moving vehicle. In some examples, the ATSC 3.0 receiver 500 may be a stationary receiver, e.g., a receiver located inside a home.

The example ATSC 3.0 receiver 500 shown in FIG. 5 includes plural tuners 502 sending signals to respective demodulators 504 picked up by the tuners from one or more antennae 506. In the non-limiting example shown, the ATSC 3.0 receiver 500 has two tuners and two demodulators, it being understood that the receiver may have a greater or lesser number of tuner/demodulators. In the non-limiting example shown, the ATSC 3.0 receiver 500 has four antennae, it being understood that the receiver may have a greater or lesser number of antennae. The receiver 500 may have the capability to switch antennae input to the tuners, such that a first tuner may receive signals from, e.g., three antennae and a second tuner may receive signals from the fourth antenna, and then a switch may be made to swap antenna input between the tuners. Two antennae may provide input to each respective tuner. All four antennae may provide input to a single tuner. These and other antenna-tuner configurations can be changed on the fly during operation as needed.

Figure 6:
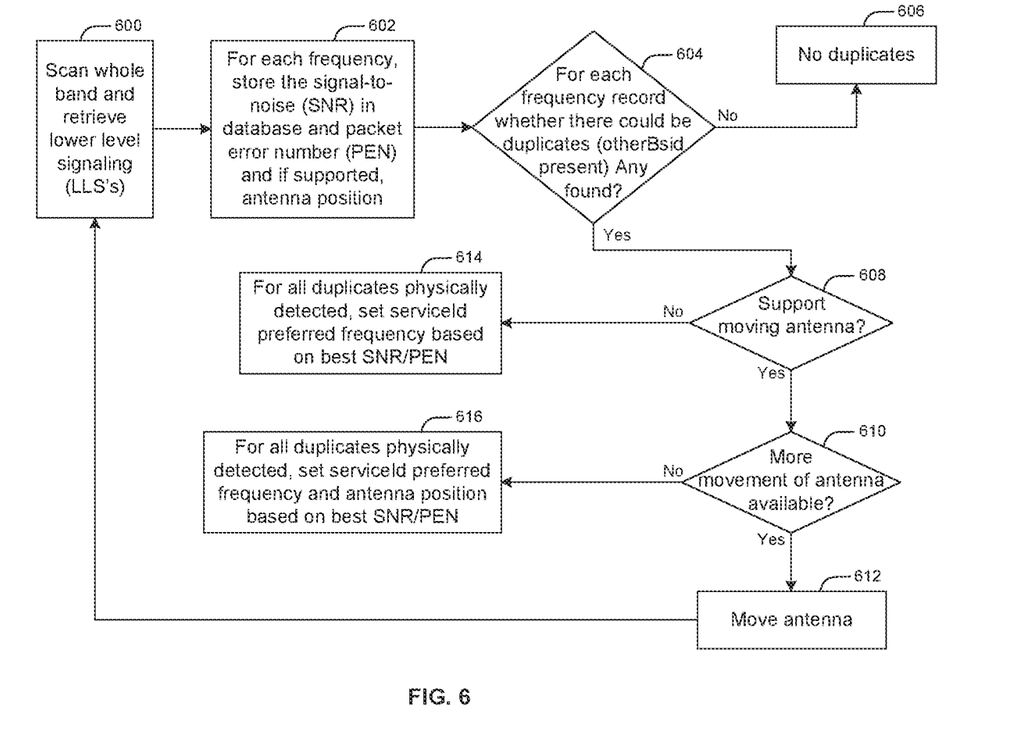
FIG. 6 illustrates example logic in example flow chart format consistent with present principles.
Figure 7:
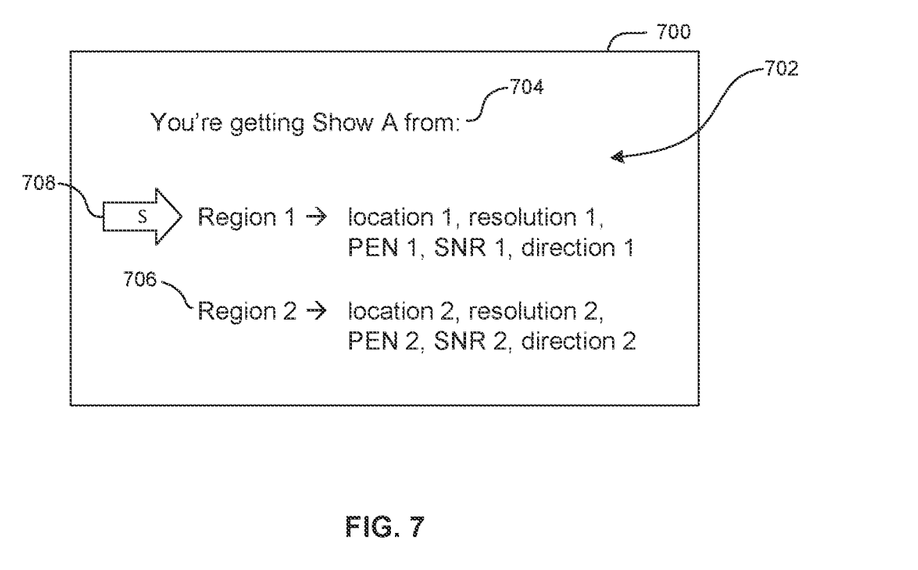
FIG. 7 illustrates an example user interface (UI) consistent with present principles.

FIG. 6 illustrates example logic for using a single lower level (signaling) physical layer pipe (PLP) to acquire information to optimize frequency tuning in the boundary area 302 in FIG. 3, while FIG. 7 illustrates a UI consistent with FIG. 6. A PLP is a portion of the RF channel which has certain modulation and coding parameters. More specifically, a single ATSC 3.0 broadcast RF channel can contain one or more logical channels, called PLPs, and each PLP can carry one or more audio video services. In addition, a single service can be carried by more than one PLP. A lower level PLP can contain information (lower level signaling or LLS) regarding frequency scans, service identifiers such as broadcast stream identifiers (BSID) and global session identifiers (GSID), and other information. Using the lower level PLP, higher level PLPs carrying AV services and related signaling (such as service layer signaling or SLS) can be identified.

A BSID is tied through a database to a corresponding broadcast frequency on which a service, from the particular broadcaster associated with the BSID, can be received. Thus, a first BSID and related information may indicate that a service can be received from a first broadcaster on a first frequency, and a second BSID and related information may indicate that the same service may be received from a second broadcaster on a second, different frequency than the first frequency.

FIG. 6 illustrates example logic for using a single lower level (signaling) physical layer pipe (PLP) to acquire information to optimize frequency tuning in the boundary area 302 in FIG. 3, while FIG. 7 illustrates a UI consistent with FIG. 6. A PLP is a portion of the RF channel which has certain modulation and coding parameters. More specifically, a single ATSC 3.0 broadcast RF channel can contain one or more logical channels, called PLPs, and each PLP can carry one or more audio video services. In addition, a single service can be carried by more than one PLP. A lower level PLP can contain information (lower level signaling or LLS) regarding frequency scans, service identifiers such as broadcast stream identifiers (BSID) and global session identifiers (GSID), and other information. Using the lower level PLP, higher level PLPs carrying AV services and related signaling (such as service layer signaling or SLS) can be identified.

A BSID is tied through a database to a corresponding broadcast frequency on which a service, from the particular broadcaster associated with the BSID, can be received. Thus, a first BSID and related information may indicate that a service can be received from a first broadcaster on a first frequency, and a second BSID and related information may indicate that the same service may be received from a second broadcaster on a second, different frequency than the first frequency.

Commencing at block 600, a digital TV receiver such as any of the ATSC 3.0 receivers described herein is used to perform an initial frequency scan to retrieve LLS PLPs. During the scan, for each detected frequency, one or more quality metrics are identified and stored at block 602 along with antenna position when a movable antenna is supported. The quality metrics can include, e.g., signal to noise ratio (SNR) and error rate as may be represented by, e.g., packet error number (PEN). The quality metrics can include resolution, e.g., whether a service is in high definition (HD) or standard definition (SD). The quality metric also can include bit-rate and form-factor, recognizing that not all HD is the same. The quality metrics can include content attributes such as whether a service supports foreign languages, accessibility signaling (e.g. where signing is being done), audio description, and other content aspects. The quality metrics can include locality preference (such as a first region channel being strong, but all the ads are for the first region and not a second region preferred by the user so that a duplicate service from the second region may be accorded preference over the first region). The quality metrics can include quality of user interfaces carried in the service.

In non-limiting examples SNR may be determined during the scan by noting both the received signal strength of each received frequency and any accompanying noise on that frequency and determining the quotient thereof. Error rate may be determined by, e.g., determining a percentage of packets missed (by noting missing packet numbers) and/or by determining a percentage of received packets with errors in them as determined by error correction algorithms.

Moving to decision state 604, it is determined, e.g., using service identification information in the LLS PLP, whether any service is duplicatively carried on two or more frequencies from, e.g., two or more broadcasters whose signals overlap on the boundary area shown in FIG. 3.

If no duplicate services are detected, the logic may proceed to block 606 to indicate such. Otherwise, if a movable antenna is supported at decision state 608, it may be determined at decision state 610 whether additional antenna movement is available. If so, the antenna is moved at state 612 and the logic loops back to block 600 to execute a re-scan of the frequency spectrum. It is to be understood that if desired, even if the scan reveals duplicate services, the antenna may be moved to do a re-scan to find additional duplicates.

In contrast, for each duplicate service detected at state 604 when the antenna cannot be moved, the logic moves to state 614 to select the service from among the duplicate services (by selecting serviceID) to the frequency with the best quality metric, e.g., SNR or PEN. Similarly, when antenna movement is supported but no further antenna movement is available at state 610, the logic moves to state 616 to select the service from among the duplicate services (by selecting serviceID) to the frequency with the best quality metric, e.g., SNR or PEN, also storing the antenna position at which the best frequency was detected.

If no difference between quality metrics of two frequencies carrying the same service satisfies the relevant threshold, one of the frequencies may be randomly chosen to tune to present the service when demanded by the user.

The above logic may be automatically implemented to select a frequency for a duplicatively broadcast service for the user when, e.g., the user attempts to tune to the service on either frequency, or the logic may be used to recommend a frequency to the user to allow the user to manually tune to that frequency for the desired service.

In this latter regard FIG. 7 illustrates a display 700 such as any of the displays described herein that can be used to present a UI 702 consistent with the logic of FIG. 6 responsive to a user, e.g., attempting to tune to a desired duplicatively broadcast service. The UI 702 may include a prompt or message 704 that a particular service (or "show" or "program") is being received from two (or more) broadcast regions indicated at 706. A selector 708 may be used by the user to select which region (and hence which frequency) to receive the desired service from.

As shown, each indication 706 may include information about the frequency from that region on which the desired service is carried. This information may include the location of the broadcast station in the region, the resolution (e.g., high definition or standard definition) of the service being received from the region, the PEN of the service being received from the region, the SNR of the service being received from the region, and the direction from the user's present location as indicated by, e.g., global positioning satellite (GPS) to the broadcast station of the region. This latter information may be useful for mobile receivers so that the user may know whether he is traveling toward or away from a particular station.

Figure 8:
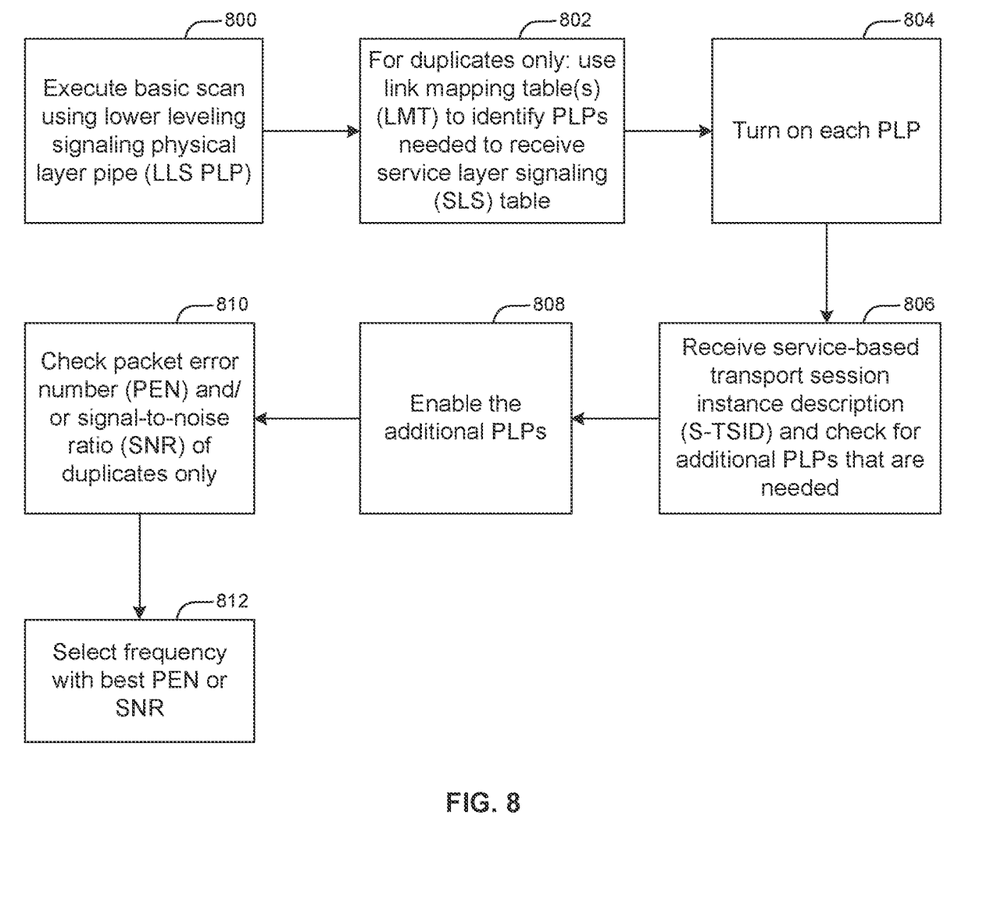
FIG. 8 illustrates example logic in example flow chart format consistent with present principles.

While FIGS. 6 and 7 consider the use of only the LLS PLP to determine quality metrics of boundary area frequencies carrying the same service, FIG. 8 illustrates alternate logic that uses more than the LLS PLP to obtain a more granular indication of quality metrics. Commencing at block 800, a basic scan of frequencies is executed using the LLS PLP. This scan identifies services being received and, hence, whether any service or services are being duplicatively received in the boundary area from, e.g., two or more broadcasters.

Proceeding to block 802, for duplicate services identified in block 800, a link mapping table (LMT) pointed to by the LLS PLP is accessed to identify additional higher level PLPs (SLS PLPs) that are required to receive an SLS table. Using the SLS table, the higher level PLPs carrying a duplicate service are identified and turned on or enabled at block 804.

Each higher-level PLP includes a ROUTE signaling structure called a service-based transport session instance description (S-TSID), which is part of the service layer signaling and which indicates properties of channels including a transport session identifier (TSI) value for each channel, descriptors for the delivery objects/files, and application layer forward error correction (FEC) parameters ROUTE sessions for the components delivered in the broadcast stream which delivers S-TSID itself. For each frequency carrying each duplicate service, the S-TSID is received at block 806 and checked for additional PLPs that may be required to access a duplicate service. Any identified additional PLPs are enabled at block 808.

Moving to block 810, using the now-enabled PLPs are checked to determine their quality metrics including PEN and/or SNR. In this way, only PLPs associated with duplicatively carried services are turned on and monitored for quality, relieving the receiver of laboriously checking every possible PLP including many which will not be duplicatively carrying a service.

Note that the higher level PLPs may be accessed using the same or a different tuner/demodulator than that used to access the lower level PLP. Likewise, the higher level PLPs may be accessed using the same or a different antenna than that used to access the lower level PLP.

A tuner/demodulator may turn on all the PLPs needed when rendering the service in its entirety. In some implementations a second tuner/demodulator may completely receive the service, knowing it is duplicative, whilst allowing the primary to continue with its scanning in parallel. This would speed up the process. The secondary tuner may need to queue up the duplicate frequencies as the primary tuner finds them. In any case the secondary tuner may activate all PLPs, including the LLS PLP, to receive and measure the complete service.

Ending at state 812, for each identified duplicatively received service by the receiver, the best frequency is selected, either automatically or by the user using, e.g., a UI similar to that shown in FIG. 7, to receive the service, typically upon demand for the service by the user.

Figure 9:
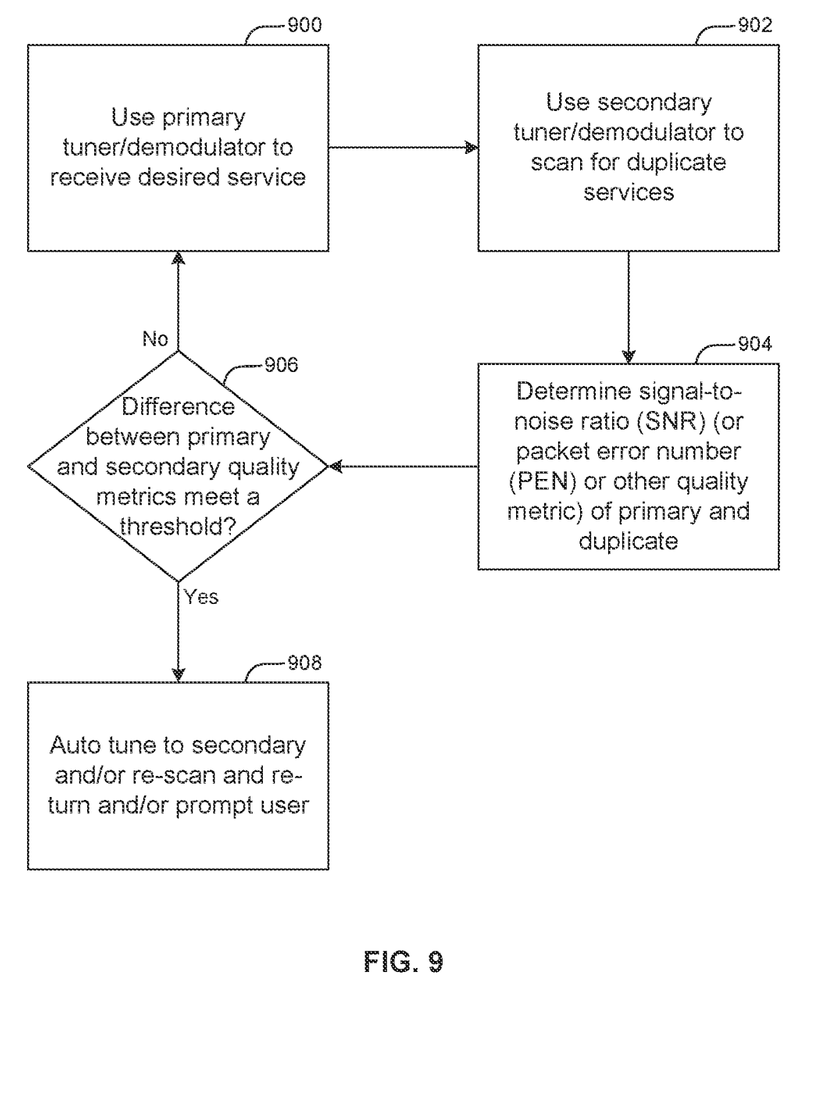
FIG. 9 illustrates example logic in example flow chart format consistent with present principles.
Figure 10:
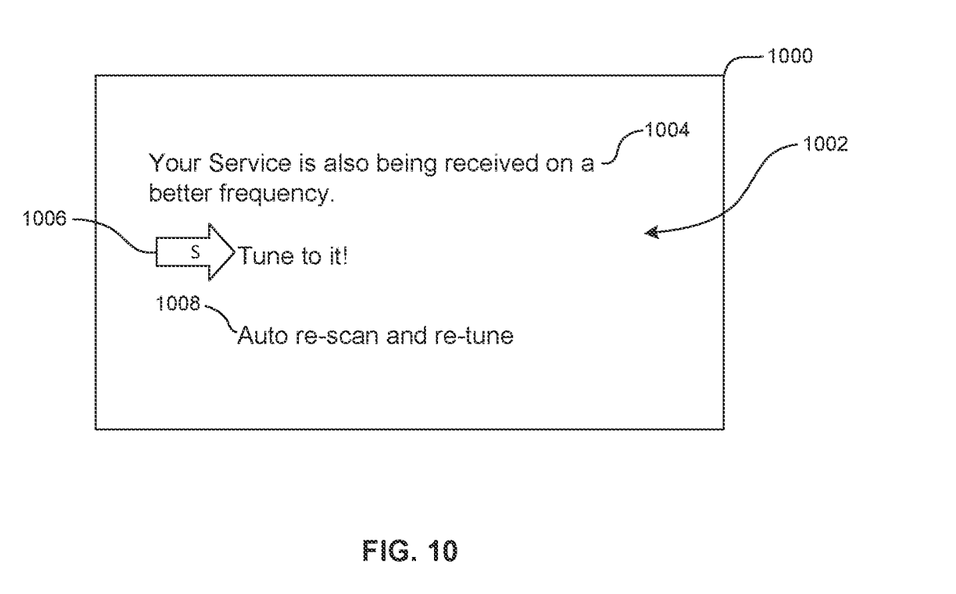
FIG. 10 illustrates an example user interface (UI) consistent with present principles.

FIGS. 9 and 10 illustrate yet another technique for identifying duplicatively received services on differing frequencies and providing the best frequency for a duplicate service to the user. Commencing at block 900 in FIG. 9, a receiver such as the ATSC 3.0 receiver 500 shown in FIG. 5 uses one of its plural tuner/demodulators to receive a desired service (and play the service). This tuner/demodulator may be considered to be a primary tuner/demodulator and may receive input from, e.g., three of four of the antennae shown in FIG. 5.

The receiver, during play of the service, may also use another one of its tuner/demodulators, which may be considered a secondary tuner/demodulator, to scan for duplicate services at block 902. The secondary tuner/demodulator may use only a single antenna. It is to be understood that the primary may use fewer than three antennae as input and the secondary may use more than one antenna as input. Note that the scan for duplicate services at block 902 may employ, for instance, the technique of FIG. 7 or the technique of FIG. 8 or other suitable technique.

Proceeding to block 904, using information from the scan at block 902 one or more quality metrics (SNR, PEN, or other desired metric) of the frequency on which the service is being received by the primary tuner/demodulator as well as the quality metrics of the frequency on which the service is duplicatively detected using the secondary tuner/demodulator are determined. Decision state 906 indicates that the primary and secondary metrics are compared to determine whether the difference between them satisfies a threshold. If not, the logic may loop back to block 900, but when the difference satisfies the threshold (i.e., the frequency from the secondary tuner/demodulator may be considered to be significantly better in terms of quality than the primary), the logic moves to block 908.

At block 908, the secondary tuner/demodulator automatically may be used to deliver the demanded service for presentation of the service, with the primary tuner/demodulator being switched use to scan for duplicate services. In addition or alternatively, a re-scan and re-tune of available frequencies may be automatically executed by the primary and/or secondary tuner/demodulator.

Yet again, instead of automatic corrective action, the user may be informed of the duplicate service situation and allowed to take action. FIG. 10 illustrates an example display 1000 such as any of the displays described herein presenting an example UI 1002 with a message or prompt 1004 that the demanded service is available on another, better frequency. The user may select a selector 1006 to tune to the better frequency (i.e., the frequency detected by the secondary tuner/demodulator). Or, the user may select a selector 1000 to execute an automatic re-scan of the spectrum and re-tuning to the best frequency carrying the demanded service. Further information for each frequency carrying the demanded service such as the information illustrated in FIG. 7 may be used in the UI 1002 of FIG. 10.

It is to be understood that while visually perceptive UIs are illustrated herein, the UIs may be perceived by a person visually and/or audibly (e.g., played on speakers), and/or tactilely, e.g., by activating a haptic generator system to generate tactile signals representing the elements of the UIs described herein.

It will be appreciated that whilst present principals have been described with reference to some example embodiments, these are not intended to be limiting, and that various

What is claimed is:

1. In broadcast digital television comprising at least one region in which at least one DTV receiver receives broadcast signals from at least first and second digital television broadcast assemblies, a method, comprising:
   using a first tuner of a digital television receiver, receiving a demanded service carried by a first broadcast signal;
   using a second tuner of the digital television receiver, scanning a frequency spectrum for a duplicate of the demanded service carried by a second signal from the first digital television broadcaster assembly or from the second digital television broadcaster assembly; and
   identifying respective first and second quality metrics associated with the respective demanded service and duplicate of the demanded service to form a basis for selecting which broadcast signal to tune to for presenting a service, wherein the digital television receiver comprises an advanced television systems committee (ATSC)-3 receiver and wherein the first and second quality metrics comprise signal-to-noise ratios (SNR), or packet error number (PEN), or both SNR and PEN.

2. The method claim 1, wherein the digital television receiver comprises an advanced television systems committee (ATSC) 3.0 receiver.

3. The method of claim 1, comprising automatically tuning to the first or second broadcast signal based on the quality metric of the respective first or second broadcast signal without user intervention.

4. The method of claim 1, comprising presenting an audibly or visually perceptive message to tune to the first or second broadcast signal based on the quality metric of the respective first or second broadcast signal.

5. The method of claim 1, wherein the digital TV receiver is a mobile receiver.

6. The method of claim 1, wherein the first and second quality metrics comprise signal-to-noise ratios (SNR).

7. The method of claim 1, wherein the first and second quality metrics comprise packet error number (PEN).

8. The method of claim 1, comprising presenting the demanded service responsive to the second quality metric of the duplicate of the demanded service not exceeding the first quality metric of the demanded service by at least a threshold.

9. A digital television apparatus comprising:
   at least one receiver configured to receive digital television from a digital television transmitter system comprising at least first and second terrestrial broadcast transmitters, the receiver comprising:
   at least one processor programmed with instructions to:
   present a demanded service acquired from a first tuner;
   while presenting the demanded service, use a second tuner to scan a digital television broadcast over-the-air (OTA) frequency range for a duplicate of the demanded service;
   determine respective quality metrics associated with the demanded service and the duplicate of the demanded service; and
   select to present the demanded service or the duplicate of the demanded service based on the quality metrics, wherein the receiver comprises an advanced television systems committee (ATSC)-3 receiver and wherein the quality metrics comprise signal-to-noise ratios (SNR), or packet error number (PEN), or both SNR and PEN.

10. The digital television apparatus of claim 9, wherein the digital television receiver comprises an advanced television systems committee (ATSC) 3.0 receiver.

11. The digital television apparatus of claim 9, wherein the instructions are executable to automatically tune to the demanded service or the duplicate of the demanded service without user intervention.

12. The digital television apparatus of claim 9, wherein the instructions are executable to present an audibly or visually perceptive message to tune to the demanded service or the duplicate of the demanded service.

13. The digital television apparatus of claim 9, wherein the receiver comprises plural antennae, and the first tuner is connected to more antennae than the second tuner.

14. The digital television apparatus of claim 9, wherein the receiver is a mobile receiver.

15. The digital television apparatus of claim 9, wherein the instructions are executable to continue tuning to the demanded service responsive to the quality metric of the duplicate of the demanded service not exceeding the quality metric of the demanded service by at least a threshold.

16. A digital television apparatus comprising:
   at least one receiver comprising at least one processor programmed with instructions to configure the processor to:
   receive from plural digital television broadcasters information from respective frequencies;
   present a service on the receiver received from a first tuner tuned to a first one of the frequencies;
   scan the frequencies for a duplicate of the service using a second tuner; and
   responsive to a relationship of quality metric of the duplicate of the service to a quality metric of the service, present the duplicate of the service in lieu of the service from the first tuner, wherein the service comprises an advanced television systems committee (ATSC)-3 service and the quality metrics comprise signal-to-noise ratios (SNR), or packet error number (PEN), or both SNR and PEN.

17. The digital television apparatus of claim 16, wherein the digital television receiver comprises an advanced television systems committee (ATSC) 3.0 receiver.

18. The digital television apparatus of claim 16, wherein the relationship comprises satisfying a threshold.

19. The digital television apparatus of claim 18, wherein responsive to satisfying the threshold, the instructions are executable to automatically present the duplicate of the service using the second tuner.

20. The digital television apparatus of claim 18, wherein responsive to satisfying the threshold, the instructions are executable to automatically re-scan the frequencies.

* * * * *